US012645262B2

(12) United States Patent
Fischkin

(10) Patent No.: US 12,645,262 B2
(45) Date of Patent: Jun. 2, 2026

(54) SMART DEVICE HOLDER WITH ILLUMINATION MEANS

(71) Applicant: Steven Fischkin, Tampa, FL (US)

(72) Inventor: Steven Fischkin, Tampa, FL (US)

( * ) Notice: Subject to any disclaimer, the term of this patent is extended or adjusted under 35 U.S.C. 154(b) by 53 days.

(21) Appl. No.: 18/431,213

(22) Filed: Feb. 2, 2024

(65) Prior Publication Data

US 2025/0251758 A1 Aug. 7, 2025

(51) Int. Cl.
| | |
|---|---|
| *G06F 1/16* | (2006.01) |
| *F21V 23/04* | (2006.01) |
| *F21V 33/00* | (2006.01) |
| *H02J 50/00* | (2016.01) |
| *F21Y 103/33* | (2016.01) |

(52) U.S. Cl.
CPC .......... G06F 1/166 (2013.01); F21V 23/0485 (2013.01); F21V 33/0052 (2013.01); H02J 50/005 (2020.01); *F21Y 2103/33* (2016.08)

(58) Field of Classification Search
CPC .. G06F 1/1632; H02J 50/005; F21V 23/0485; F21V 33/0052; F21Y 2103/33
See application file for complete search history.

(56) References Cited

U.S. PATENT DOCUMENTS

| | | | | |
|---|---|---|---|---|
| 5,844,472 A | * | 12/1998 | Lee | H02J 7/0068 362/439 |
| D873,328 S | * | 1/2020 | Shen | D26/113 |
| D880,048 S | * | 3/2020 | Zhu | D26/106 |

| | | | | |
|---|---|---|---|---|
| 2008/0113150 A1 | * | 5/2008 | Lee | F16B 47/00 428/99 |
| 2011/0117959 A1 | * | 5/2011 | Rolston | H04N 9/3176 455/556.1 |
| 2011/0148352 A1 | | 6/2011 | Wang | |
| 2014/0160654 A1 | * | 6/2014 | Yoo | G06F 1/1637 361/679.12 |
| 2014/0292396 A1 | * | 10/2014 | Bruwer | H03K 17/962 327/517 |

(Continued)

FOREIGN PATENT DOCUMENTS

| | | |
|---|---|---|
| WO | 2019114469 | 6/2019 |
| WO | 2022080556 | 4/2022 |

OTHER PUBLICATIONS

Beamo Ring Light for MagSafe https://joby.com/us-en/beamo-ring-light-for-magsafe-gray-jb01755-bww/ (Year: 2022).*

(Continued)

*Primary Examiner* — Adrian S Wilson
(74) *Attorney, Agent, or Firm* — Edison Law Group, PLLC

(57) ABSTRACT

A smart device holder with illumination means that provides additional lighting for activities such as recording while using a cell phone. The holder includes a ring light with a touch-sensitive brightness adjuster, allowing the user to easily control the intensity of the light. It also features a charging port for wireless charging of the attached phone and a power button with a battery life indicator. The holder is designed with a spring system that keeps the inner surface deployed while in use, but can be pushed back into the outer shell and locked in place when not in use. Additionally, an integrated kickstand allows the phone to stand freely without being affixed to any other surface.

5 Claims, 6 Drawing Sheets

(56)　　　　　References Cited

U.S. PATENT DOCUMENTS

| 2015/0002088 A1* | 1/2015 | D'Agostino | ............ | H02J 50/10 |
| | | | | 320/108 |
| 2021/0167624 A1 | 6/2021 | Su | | |
| 2023/0040986 A1 | 2/2023 | Zhijian | | |

OTHER PUBLICATIONS https://www.nytimes.com/wirecutter/reviews/best-qi-wireless-car-phone-charger-mounts/.
https://www.amazon.com/CARBON-XT-Wireless-Magnetic-Charger/dp/B089P2FBXC?th=1.

* cited by examiner

5

10

35

25

40

45

SMART DEVICE HOLDER WITH ILLUMINATION MEANS

BACKGROUND OF THE INVENTION

Mobile electronic devices, such as smartphones, tablets, and mobile computers, have become ubiquitous in modern life, serving as essential tools for communication, productivity, and entertainment. These devices often feature integrated cameras that enable users to capture photos and videos. However, one common challenge faced by users is inadequate lighting conditions when taking photos or recording videos. This limitation can result in low-quality content and missed opportunities to capture important moments effectively.

To address this issue, various auxiliary lighting solutions have been developed, including external flash units and clip-on lights. While these accessories provide additional illumination, they are often cumbersome to use and may require separate setup, making them less than ideal for on-the-go situations. Moreover, existing mobile device holders, designed to secure these devices in place for hands-free operation, typically lack integrated lighting capabilities.

The present invention seeks to provide an innovative solution to the primary challenge faced by users when using the camera feature on mobile electronic devices. The primary issue is the lack of a convenient and stable placement for the phone while capturing photos and videos. Users often resort to holding the device in their hand, resting it on random surfaces, or using bulky tripods, which can be cumbersome. The invention addresses this challenge by combining the functionality of a mobile electronic device holder with integrated illumination means. This novel fusion offers users a hands-free solution for securing their devices at a suitable angle, ensuring stable positioning while capturing high-quality images and videos. The integrated illumination means complements this primary function to enhance the overall user experience.

The invention pertains to a smart device holder with illumination means, meticulously crafted for mobile electronic devices like smartphones, tablets, mobile computers, and analogous gadgets. This holder presents a secure attachment mechanism for firmly affixing the device to a secondary structure, all the while integrating illumination means to augment the lighting conditions for the device's camera. Additionally, the holder incorporates a magnetic connection system that enables wireless charging for the mobile electronic device, whether it be a smartphone or tablet. This magnetic attachment method is akin to the commonly used magnetic mounts for GPS devices, ensuring user-friendliness and a secure connection.

SUMMARY OF THE INVENTION

The primary objective of the present invention is to provide a versatile mobile electronic device holder with integrated illumination means. This holder is designed to securely attach to various secondary structures, ensuring the stable positioning of the electronic device. Simultaneously, it offers adjustable illumination options to optimize lighting conditions for capturing photos and videos.

The smart device holder comprises a back wall with four sides, four side walls attached at 90-degree angles to the back wall, and a top wall with at least one hole to provide access to the device's screens, buttons, or other operating elements. Additionally, the holder includes at least one light source, strategically positioned to illuminate subjects within the camera's range on the electronic device.

The back wall may feature one or more holes to enable a camera attached to the electronic device to view objects external to the holder. The placement of the light source may vary, depending on the camera's location, and it can be either detachable or permanently affixed to the holder.

In addition to device stability and illumination, the holder's design incorporates features that allow users to access the electronic device's operational controls, enhancing the overall user experience.

The power source for the integrated light source may consist of internal batteries or connections within the holder to utilize the electronic device's battery for powering the light. This arrangement ensures extended usage without compromising the device's energy resources.

The holder can be constructed from various materials, with ABS plastic molding being a preferred choice. However, other materials may be employed based on the intended usage environment and durability requirements.

Furthermore, the bottom of the holder may incorporate a small hole to facilitate tripod attachment, providing additional flexibility for users who require stable positioning during photography or videography. The holder's design allows it to adhere to flat or relatively flat surfaces using various sticking technologies, such as magnets, physical adhesives, nano-sticking technology, suction cups, microsuction cups, Velcro, or similar attachment means.

The invention's versatility extends to numerous alternative features, including the option for lights to wrap around the sides, pull-out tripods or selfie sticks, Bluetooth speaker functionality, responsive lighting to music or audio volume, and multiple angles and tilting capabilities for different device orientations. Moreover, it can serve as a vehicle accessory, attach to a variety of surfaces, and support devices of various geometric shapes.

To accommodate different removal and installation needs, the smart device holder incorporates tabs, making it easy for users to secure or release the electronic device. These tabs enhance user-friendliness and facilitate efficient device handling.

While the description primarily focuses on mobile phone devices, the invention's versatility extends to encompass various geometric shapes, including but not limited to spheres, cylinders, cubes, stars, boxes, and akin configurations.

DETAILED DESCRIPTION OF THE INVENTION

Figure 1:
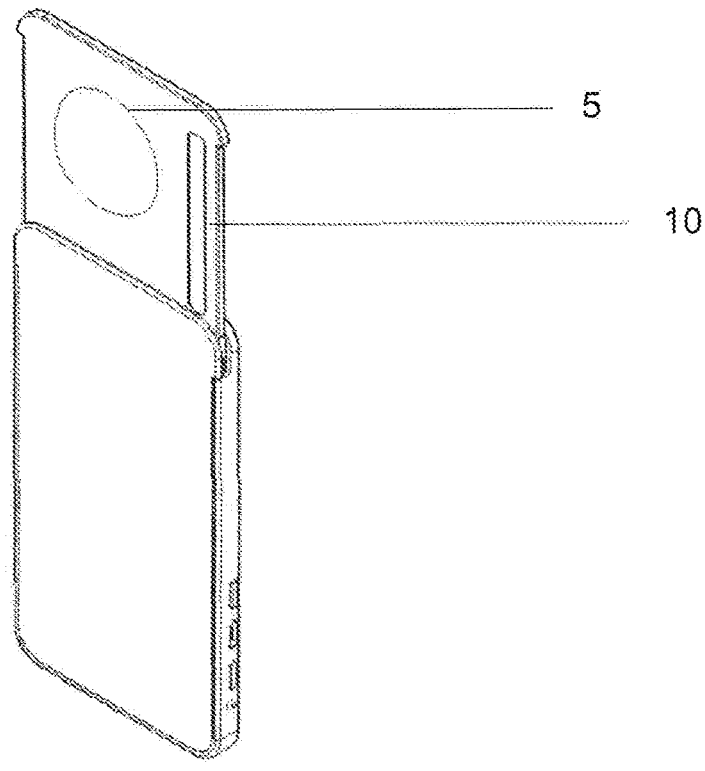
FIG. 1 shows a perspective view of the smart device holder with illumination means.

Mobile electronic devices, such as smartphones, tablets, and mobile computers, have become ubiquitous in modern life, serving as essential tools for communication, productivity, and entertainment. These devices often feature integrated cameras that enable users to capture photos and videos. However, one common challenge faced by users is inadequate lighting conditions when taking photos or recording videos. This limitation can result in low-quality content and missed opportunities to capture important moments effectively.

To address this issue, various auxiliary lighting solutions have been developed, including external flash units and clip-on lights. While these accessories provide additional illumination, they are often cumbersome to use and may require separate setup, making them less than ideal for on-the-go situations. Moreover, existing mobile device holders, designed to secure these devices in place for hands-free operation, typically lack integrated lighting capabilities.

The present invention seeks to provide an innovative solution by combining the functionality of a mobile electronic device holder with integrated illumination means. This novel fusion of a holder and illumination device aims to overcome the limitations of existing accessories by offering users a convenient, versatile, and hands-free solution for securing their devices while ensuring optimal lighting conditions for photography and videography.

In addition to these fundamental features, the invention incorporates the following advanced functionalities: nano suction technology, a detachable illumination module, wireless charging capability, an integrated kickstand, and a detachable built-in microphone attachment.

The smart device holder utilizes nano suction technology that enables it to adhere to flat surfaces securely. This technology allows users to attach the holder to various surfaces such as glass, plastic, metal, and more. Furthermore, the design allows for easy removal. Additionally, the patent application is drafted to encompass future improvements in suction technology, ensuring that the holder can adapt to and function effectively with a broader array of surfaces in subsequent versions. This flexibility enhances the patent's robustness, preventing potential workarounds through advancements in suction technology.

The invention includes a detachable illumination module, separate from the holder itself. This module is designed to provide enhanced lighting for subjects within the camera's range. Users can easily attach or detach the module as needed, offering additional versatility in various lighting conditions.

A magnetic connection system is integrated into the holder, allowing it to wirelessly charge the mobile electronic device, whether it be a smartphone or tablet. The device has a battery that facilitates a wireless charging transmitter, which is received by the charging receiver of the phone. The phone is attached to the device by a magnetic connection to ensure proximity when charging. This magnetic attachment method is akin to the commonly used magnetic mounts for GPS devices, ensuring user-friendliness and a secure connection.

The smart device holder incorporates a kickstand mechanism that enables the attached mobile electronic device to stand upright on a desk or similar surface. This feature enhances the device's utility by allowing users to view content or engage in video calls hands-free.

The invention includes a separate microphone attachment that is part of the overall design. This microphone attachment allows users to record audio with improved clarity when capturing videos or participating in video calls. The microphone can be easily connected to the holder, enhancing the user's ability to create high-quality multimedia content.

The power source for the integrated light source and wireless charging capability may consist of internal batteries or connections within the holder to utilize the electronic device's battery for powering the light and charging functions. This arrangement ensures extended usage without compromising the device's energy resources.

The holder can be constructed from various materials, with ABS plastic molding being a preferred choice. However, other materials may be employed based on the intended usage environment and durability requirements.

Furthermore, the bottom of the holder may incorporate a small hole to facilitate tripod attachment, providing additional flexibility for users who require stable positioning during photography or videography. The holder's design allows it to adhere to flat or relatively flat surfaces using various sticking technologies, such as magnets, physical adhesives, nano-sticking technology, suction cups, micro-suction cups, Velcro, or similar attachment means.

The invention's versatility extends to numerous alternative features, including the option for lights to wrap around the sides, pull-out tripods or selfie sticks, Bluetooth speaker functionality, responsive lighting to music or audio volume, and multiple angles and tilting capabilities for different device orientations. Moreover, it can serve as a vehicle accessory, attach to a variety of surfaces, and support devices of various geometric shapes.

In some embodiments, a clasping device may be used to keep the phone secured when attached to the present subject matter.

FIG. 1 shows a perspective view of the smart device holder with illumination means wherein the ring light 5 is embedded into an inner surface and is able to provide additional lighting for things like recording while using a cell phone. The ring light 5 has a brightness adjuster 10 which is touch sensitive so the user may swipe their finger along the brightness adjuster to change the intensity of the ring light. The user may also alter the hue or type of light emitted.

Figure 2:
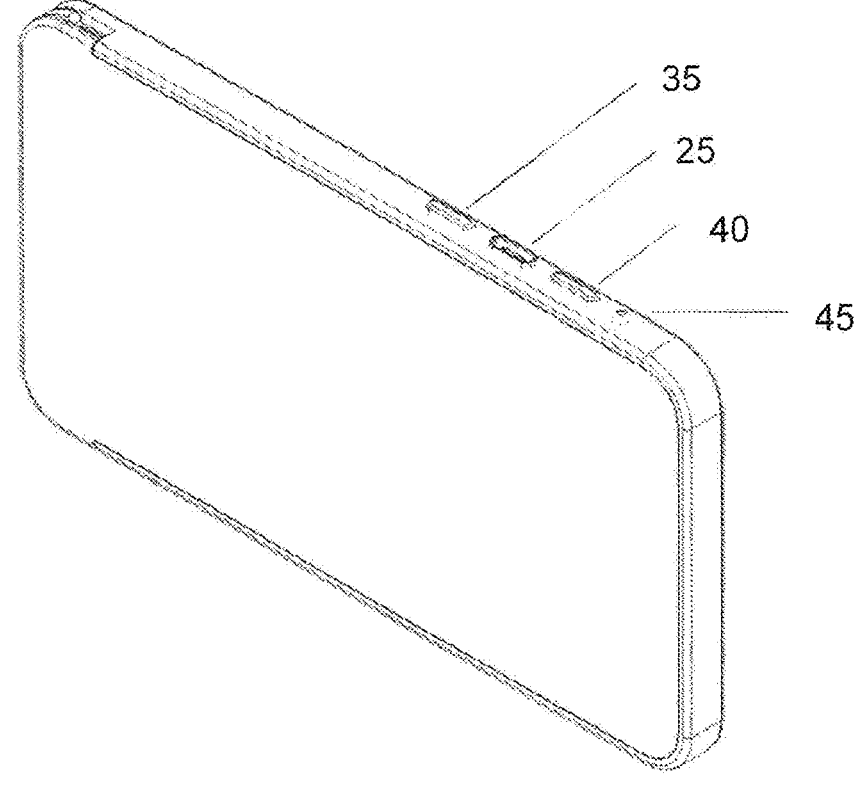
FIG. 2 shows a side perspective view of the smart device holder with illumination means.

FIG. 2 shows a side perspective view of the smart device holder with illumination means wherein a charging port 25 allows for charging of the smart device holder with illumination means which provides wireless charging of the removably affixed phone to the magnetic surface 30. A charging button 35 may be pressed to activate the wireless into the removably affixed phone. A power button 40 activates the smart device holder with illumination means and power indicator 45 allows for the user to visually see how much battery life is left on the smart device holder with illumination means.

Figure 3:
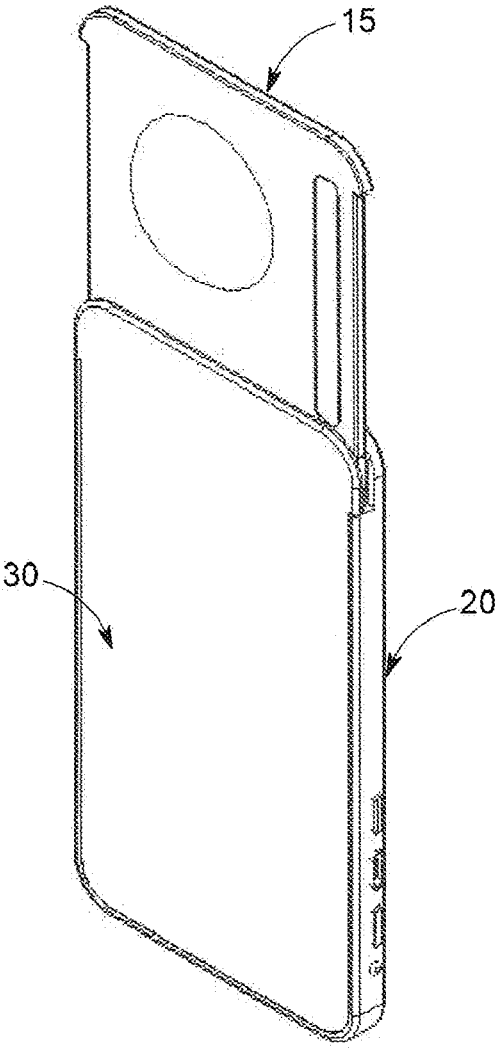
FIG. 3 shows a front perspective view of the smart device holder with illumination means.

FIG. 3 shows a front perspective view of the smart device holder with illumination means where in the ring light and brightness adjuster are affixed to an inner surface 15, which is connected to a spring system that keeps the inner surface deployed while in use. The user is then able to push the inner surface 15 back into the outer shell 20 and lock the inner surface in place while not in use.

Figure 4:
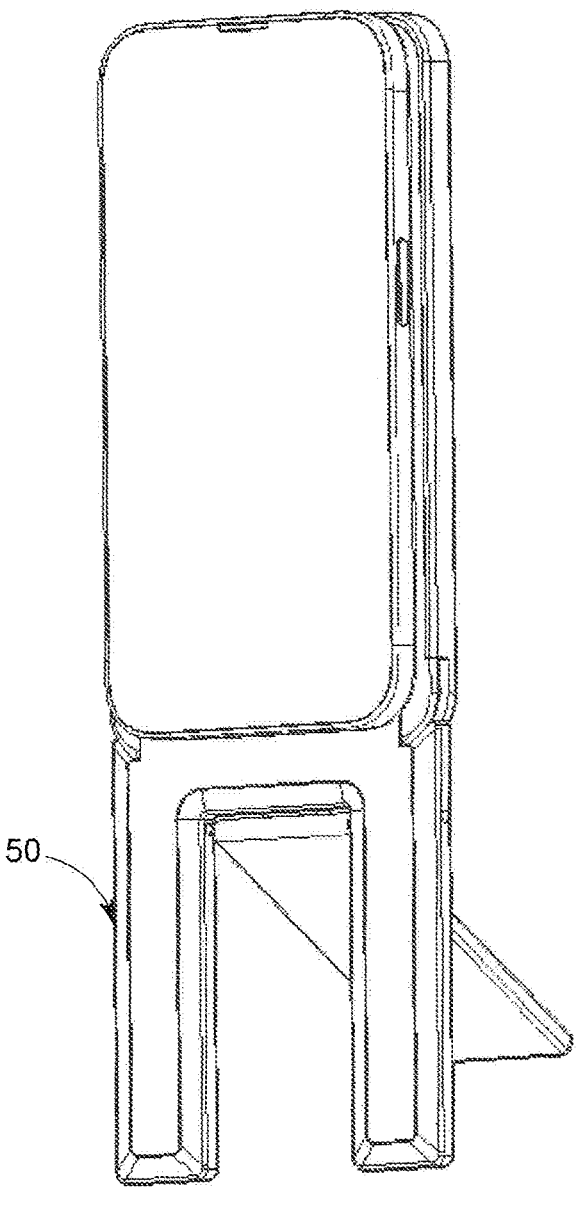
FIG. 4 shows a front perspective view of an embodiment of an integrated kickstand for the smart device holder with illumination means.

FIG. 4 shows a front perspective view of an embodiment of an integrated kickstand for the smart device holder with illumination means wherein the integrated kickstand 50 secures around the outside of the outer shell 20 and allows the phone to stand freely without being affixed to any other surface.

Figure 5:
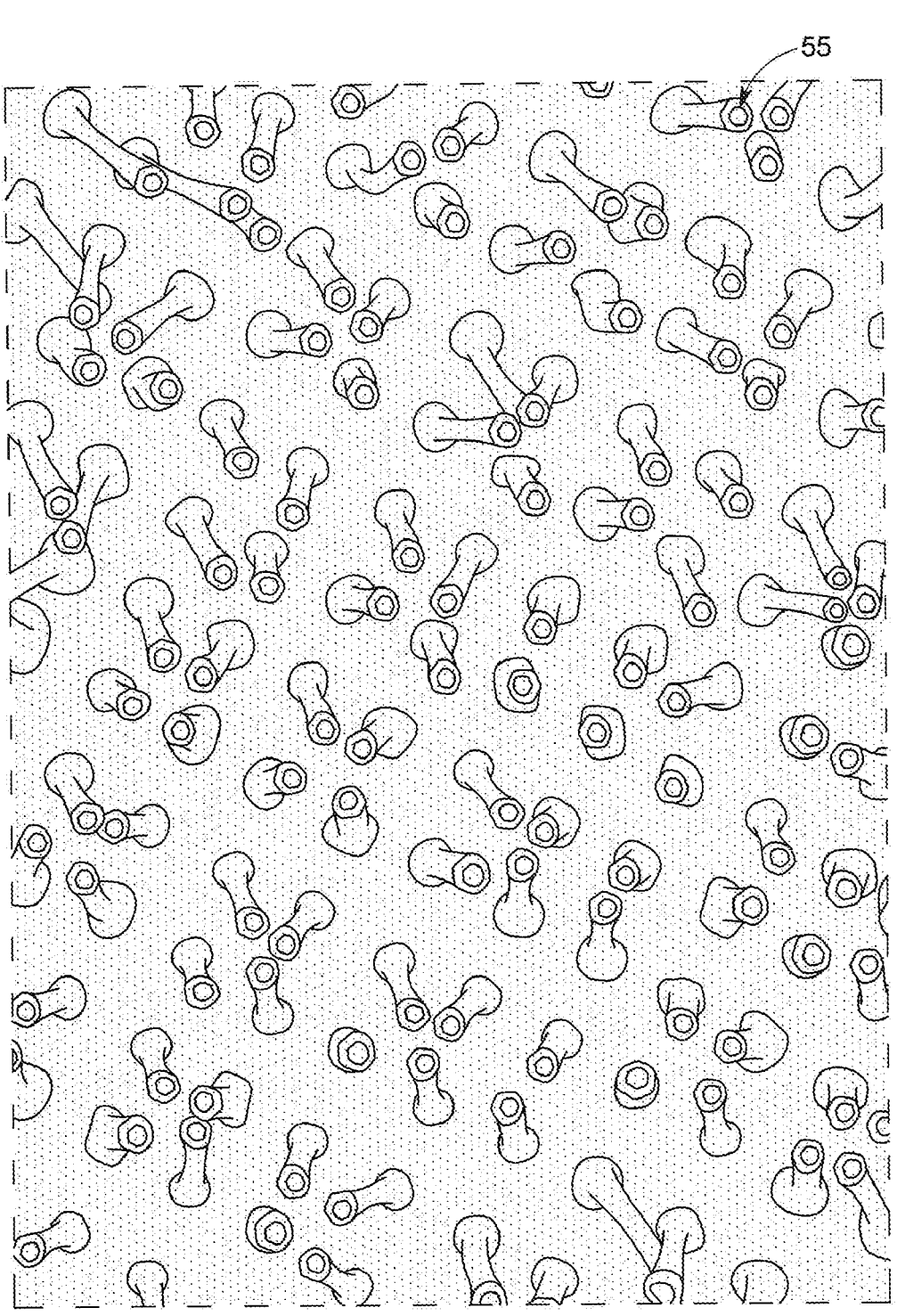
FIG. 5 shows a magnified view of the nano suction cups.

FIG. 5 shows a magnified view of the nano suction cups wherein the nano suction cups 55 enables the smart device holder with illumination means to adhere to flat surfaces such as glass, plastic, and metal securely.

Figure 6:
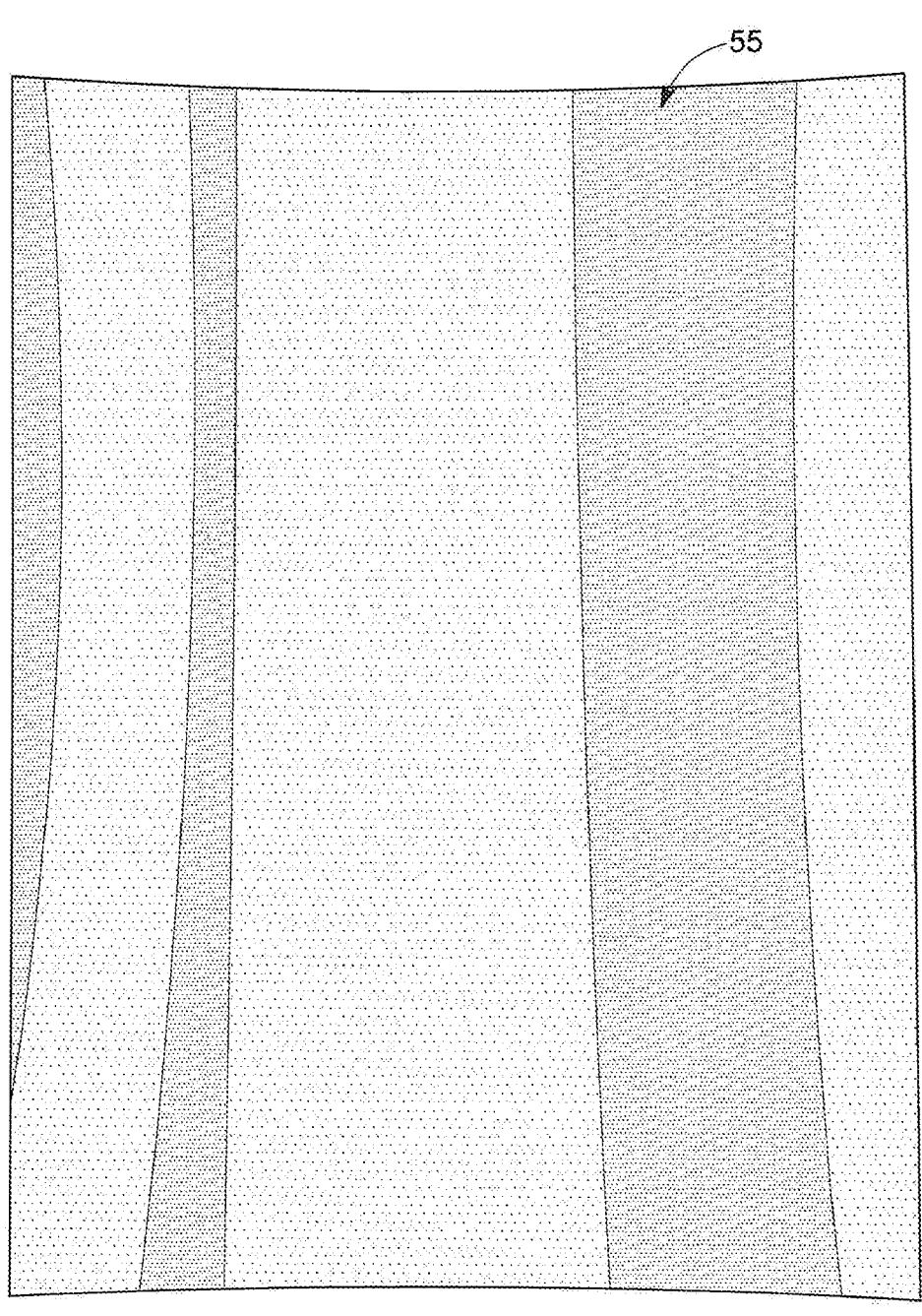
FIG. 6 shows a top view of the nano suction cup surface.

FIG. 6 shows a top view of the nano suction cup surface wherein the nano suction cups 55 are removably affixed to the back of the smart device holder with illumination means. This allows for the nano suction cup layer to be removed in the event the nano suction cup layer loses adhesiveness.

In other embodiments, the present subject matter may be charged using a wire.

To accommodate different removal and installation needs, the smart device holder incorporates tabs, making it easy for users to secure or release the electronic device. These tabs enhance user-friendliness and facilitate efficient device handling.

While the description primarily pertains to mobile phone devices, the invention's adaptability extends to various geometric shapes, including spheres, cylinders, cubes, stars, boxes, and similar configurations.

The invention claimed is:

1. A smart device holder with illumination means, comprising:

an outer shell having a magnetic surface for removably affixing a phone;

an inner surface that extends from the outer shell of the smart device holder;

a ring light embedded into the inner surface, wherein the ring light provides additional lighting for recording while using a phone;

a brightness adjuster on the ring light that is touch sensitive and allows a user to swipe their finger along the brightness adjuster to change the intensity of the ring light;

a charging port on a base unit that allows for charging of the smart device holder with illumination means;

a wireless charging function for the removably affixed phone when placed on the magnetic surface;

a charging button that activates the wireless charging function;

an adhesive layer of nano-suction cups on a backside of the smart device holder;

a power button that activates the smart device holder with illumination means; and a power indicator that visually displays a remaining battery life of the smart device holder with illumination means.

2. The smart device holder with illumination means of claim 1, wherein the user may adjust a hue of color or type of light emitted from the ring light.

3. The smart device holder with illumination means of claim 1, wherein the charging button may be activated to wirelessly charge the phone removably affixed to the smart device holder.

4. The smart device holder with illumination means of claim 1, wherein an integrated kickstand allows the user to removably affix a phone to the magnetic surface and record video or take pictures in a hands-free manner.

5. The smart device holder with illumination means of claim 1, wherein the nano-suction cup layer is removably affixed to the backside of the smart device holder.

* * * * *